(12) United States Patent
Schmidt et al.

(10) Patent No.: US 9,511,714 B2
(45) Date of Patent: *Dec. 6, 2016

(54) GEOMETRICALLY SHAPED ELLIPSOID VEHICULAR MIRROR

(75) Inventors: William P. Schmidt, Newport, MI (US); Daniel M. Swain, Wyandotte, MI (US)

(73) Assignee: ROSCO, INC., Jamaica, NY (US)

( * ) Notice: Subject to any disclaimer, the term of this patent is extended or adjusted under 35 U.S.C. 154(b) by 980 days.

This patent is subject to a terminal disclaimer.

(21) Appl. No.: 11/617,902

(22) Filed: Dec. 29, 2006

(65) Prior Publication Data

US 2008/0158700 A1 Jul. 3, 2008

(51) Int. Cl.
*B60R 1/08* (2006.01)
*G02B 5/10* (2006.01)

(52) U.S. Cl.
CPC ............... *B60R 1/082* (2013.01); *G02B 5/10* (2013.01)

(58) Field of Classification Search
CPC ............. B60R 1/06; B60R 1/082; G02B 5/10
USPC .................................. 359/866, 868
See application file for complete search history.

(56) References Cited

U.S. PATENT DOCUMENTS

| | | | | |
|---|---|---|---|---|
| 4,436,372 A * | 3/1984 | Schmidt et al. | ............... | 359/868 |
| 4,730,914 A * | 3/1988 | Stout | ............... | 359/868 |
| 5,084,785 A * | 1/1992 | Albers et al. | ............... | 359/868 |
| 5,307,211 A * | 4/1994 | Schmidt et al. | ............... | 359/868 |
| 5,589,984 A * | 12/1996 | Schmidt et al. | ............... | 359/603 |
| 6,030,084 A * | 2/2000 | Schmidt | ............... | 359/868 |
| 6,227,674 B1 * | 5/2001 | Englander | ............... | 359/853 |
| 7,012,761 B1 * | 3/2006 | Schmidt et al. | ............... | 359/708 |
| 7,134,759 B2 * | 11/2006 | Schmidt et al. | ............... | 359/868 |
| 7,241,020 B2 * | 7/2007 | Schmidt et al. | ............... | 359/866 |
| 7,267,448 B2 * | 9/2007 | Schmidt et al. | ............... | 359/868 |
| 7,517,100 B2 * | 4/2009 | Englander et al. | ............... | 359/868 |
| 7,547,108 B2 * | 6/2009 | Schmidt et al. | ............... | 359/868 |
| 7,918,569 B2 * | 4/2011 | Schmidt | ............... | B60R 1/08 359/866 |

\* cited by examiner

*Primary Examiner* — Ricky D Shafer
(74) *Attorney, Agent, or Firm* — Manatt, Phelps & Phillips, LLP

(57) ABSTRACT

Cross-view mirrors for buses and other vehicles which provide modified image sizes. The mirror assemblies have lens members created from the shape of a portion of an elliptical or circular toroid volumetric shape with an elliptical or circular cross-sectional shape. A first embodiment has an elliptical toroid volumetric shape with an elliptical cross-sectional shape. A second embodiment has an elliptical toroid volumetric shape with a circular cross-sectional shape. A third embodiment has a circular toroid volumetric shape with an elliptical cross-sectional shape,

10 Claims, 4 Drawing Sheets

GEOMETRICALLY SHAPED ELLIPSOID VEHICULAR MIRROR

TECHNICAL FIELD

The present invention relates generally to vehicle mirror assemblies, and, more particularly to exterior cross-view mirrors assemblies for vehicles.

BACKGROUND OF THE INVENTION

Vehicle mirror assemblies can play a vital role in vehicle operation. Placement of the vehicle operator within the vehicle structure often makes direct line-of-sight to surrounding vehicle areas impractical. Yet such visual inspections of surrounding areas often are necessary for the vehicle operator to properly operate the vehicle. As vehicle size increases, so often does the difficulty of accurate visual inspections. Vehicles, such as school buses and commercial vans, typically have increased sizes and require visual inspection of areas in front and to the side of the vehicle. To this end, it is well known that vehicle mirrors may be front-end mounted to the vehicle to provide the widest possible field of view around the vehicle.

Early attempts at widening the operator's field of view focused on the use of convex mirrors. By increasing the size of the convex mirror, it was discovered that the field of view could be increased. Unfortunately, increasing the size of the convex mirror quickly becomes inefficient as the mirror itself begins to become an obstruction to forward viewing. To accommodate the need for increased field of view, without negatively impacting mirror size, it is known that a domed mirror lens may incorporate a varying radius of curvature from the center portion to one or more of the perimeter edges. The varying radius of curvature achieves a compacted wide field of view or viewing area within minimal space such that the driver can look forward of the vehicle with minimal blockage of vision. These mirrors with varying radius of curvature are commonly referred to as cross-over or cross-view mirrors.

Although the use of cross-over mirror designs has proven highly successful in the increase of viewing area while minimizing mirror size, present designs still can incorporate drawbacks. One of the drawbacks of these common cross-over mirror designs results from the reflection of the vehicle itself within the mirror. In many designs, the vehicle reflection is positioned within the center of the mirror and fills a significant amount of valuable viewing space. This results in a reduction of useful mirror surface area since the user does not commonly monitor reflection of the vehicle itself. Furthermore, images reflected in the mirror along the front and side of the vehicle often appear in the perimeter regions of the mirror. The reflections in the perimeter regions are commonly reduced in proportion due to decreasing surface radius of curvature in these regions of the mirror. This can result in distorted images with reduced image proportions such as long thin images. The reduction in image proportion can result in an increased strain on the driver to identify the objects reflected in these regions.

Another problem with many of the mirrors known today, including cross-over mirrors, is that they are designed or constructed with certain curvatures and structures to attempt to resolve certain concerns. This often results in significant distortion of the mirror tens surface and resulting image. It is believed that the mirror lens which create the best quality images are those which result from natural geometry and geometric figures, such as circles, ellipses, ovals, and the like.

It would, therefore, be highly desirable to have a mirror assembly that produces the highest quality reflective images, with the least distortion, and at the same time increase the useful surface area and keep the overall mirror size to a minimum. It would further be highly desirable to have a mirror assembly that improves image proportional reflection along the mirror perimeter to facilitate improved recognition.

SUMMARY OF THE INVENTION

The present invention provides a family or series of mirrors, each with a lens member having a defined shape from natural geometric structures. The lens members are secured to bases forming mirror assemblies and the mirror assemblies are adapted to be mounted on buses or other vehicles for use as cross-over a/k/a/ cross-view mirrors. Appropriate brackets and mounting mechanisms are provided to mount the mirrors on the vehicles. The mirrors can also be utilized as rear-view mirrors for vehicles.

Each of the mirror lenses is created from the shape of a portion of a particular "doughnut" shaped member, such as an elliptical or circular toroid or torus. The cross-sectional shape of the member can be either elliptical or circular.

The shape of one mirror lens is created from a portion of an oval-shaped toroid member, particularly an end portion, the member having an oval or elliptical-shaped cross-section. Another mirror lens is created from an oval-shaped toroid member having a circular cross-section. And still another mirror lens is created from a circular-shaped toroid member with an oval or elliptical shaped cross-section.

Other features of the present invention will become apparent when viewed in light of the detailed description of the preferred embodiments when taken in conjunction with the attached drawings and appended claims.

BRIEF DESCRIPTION OF THE DRAWINGS

FIG. 9 being an end elevational view of the mirror lens.

Figure 18:
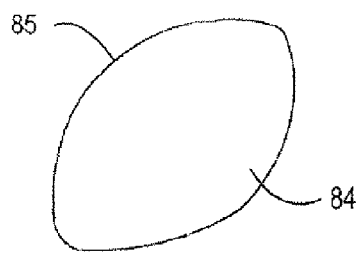
Figure 19:
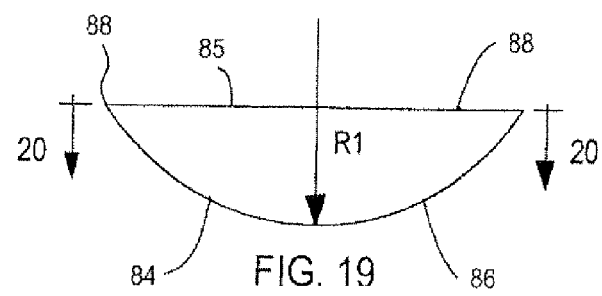
Figure 20:
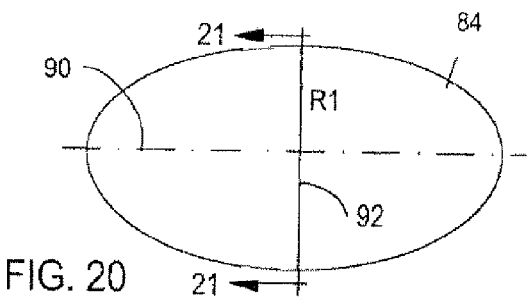
Figure 21:
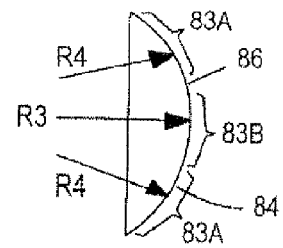

17 being a schematic illustration of the type of geometric figures, FIG. 18 being a perspective view of the mirror lens, FIG. 19 being a side elevational view of the mirror lens, FIG. 20 being a base or footprint elevational view of the mirror lens, and FIG. 21 being an end elevational view of the mirror lens.

Figure 22:
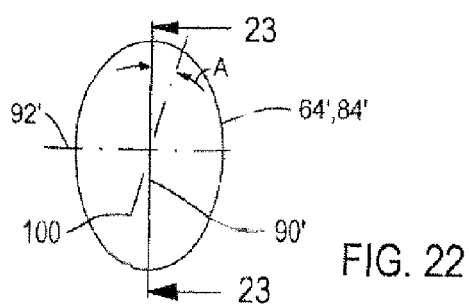
Figure 23:
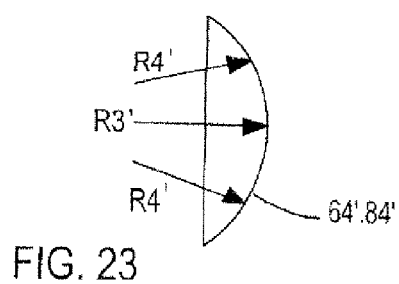

FIGS. 22-23 illustrate alternate embodiments of the invention relative to the embodiment shown in FIGS. 4-9 and 16-21.

DESCRIPTION OF THE PREFERRED EMBODIMENT(S)

Figure 1:
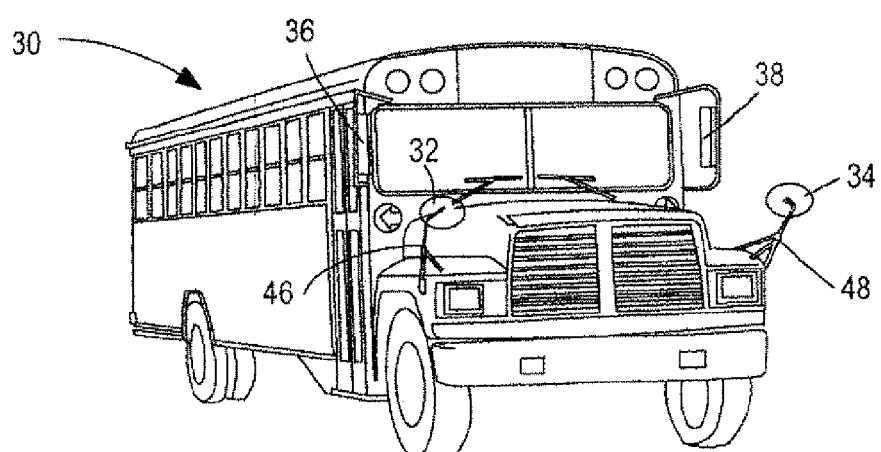
FIG. 1 is an illustration of the use of the present invention mounted on a vehicle, such as a school bus.

Referring now to FIG. 1, this is an illustration showing use of the present invention when mounted on a vehicle, such as a school bus 30. A pair of mirror assemblies 32 and 34 are illustrated mounted on the vehicle 30. In this regard, although the mirror assemblies are illustrated being mounted on a school bus, it should be understood that the present invention may be utilized with a wide variety of vehicles for a wide variety of applications. For example, the mirror assemblies are well-suited for vehicles such as trucks and vans. Similarly, although the mirror assemblies may be mounted in a variety of locations on a vehicle, one embodiment particularly suitable for school buses involves mounting the mirror assemblies on the front corners of the vehicle fenders, as shown in FIG. 1. In this regard, the mirror assemblies 32 and 34 are mounted on the school bus 30 by mounting systems such as brackets 46 and 48.

It is also noted that the school bus has conventional rear view mirror assemblies 36, 38 in positions which are typical for a vehicle so that the driver can view the situation beside and behind the bus. Vehicle mirror assemblies 32, 34 in accordance with the present invention are mounted on the front corners of the school bus 30 in order to provide the driver the fields of view that encompass both the front of the vehicle as well as the side of the vehicle. Mirrors of this type are often called cross-over or cross-view mirrors because they allow the driver to view children and other persons who may be walking across and in front of the bus.

There are a number of cross view mirror assemblies and systems known today which are used on school buses, such as those shown in U.S. Pat. No. 5,589,984. Some of those cross-view mirrors are ellipsoid vehicle mirror assemblies which have various mirror lens structure configurations. The present invention provides mirror assemblies with mirror lenses which are believed to be different in configuration from other cross-view mirror lenses and thus are highly useful for being used for cross-view mirror assemblies.

Figure 2:
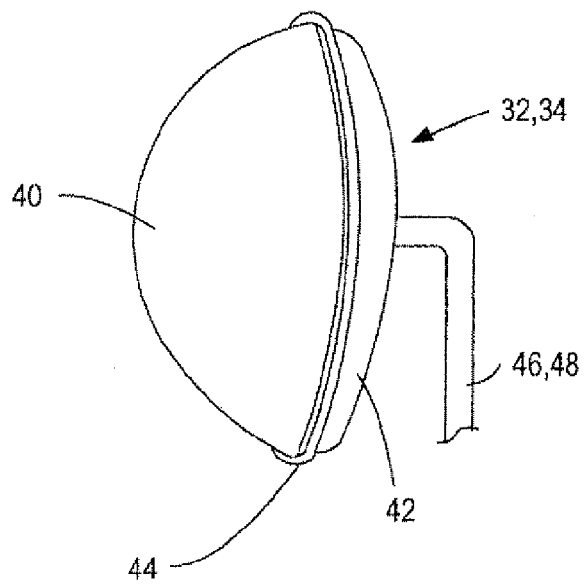
FIG. 2 is a perspective view of a vehicle mirror assembly in accordance with the present invention.

A representative cross-view mirror assembly such as mirror assembly 32, 34 shown in FIG. 1, is illustrated in FIG. 2. The mirror assembly includes a mirror lens 40 and a base member 42. The mirror lens and base member are preferably sealed together, such as by gluing or the like. A sealing member 44, such as an elastomeric member, is positioned around the joint or intersection between the lens and base members in order to seal the intersection or joint and make it more aesthetically pleasing. The mounting bracket 46, 48 or mounting bracket assemblies of any type known in the art can be used to connect and position the mirror assemblies on the vehicle.

Figure 3:
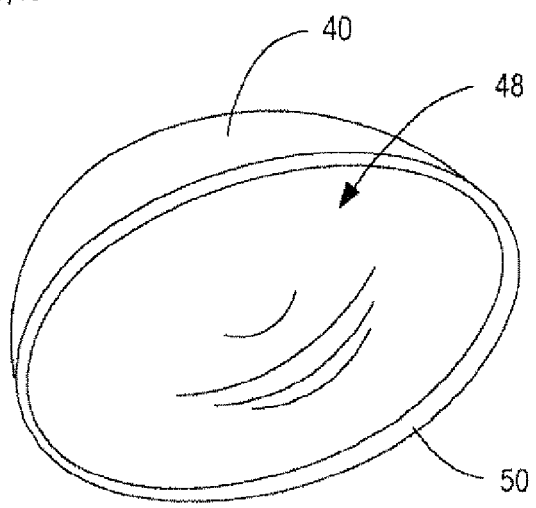
FIG. 3 illustrates a lens member in accordance with the present invention.

FIG. 3 illustrates the lens member 40 for the mirror assembly. Lens member 40 is preferably a hollow dome-type lens member having a hollow interior 48 and an outer rim 50. The rim 50 could also have a flange member or the like on it as is typical with cross-view mirror assemblies in order to provide a better surface to mate with a base member. The mirror dome lens member 40 may be manufactured from any suitable plastic material by any suitable method of manufacture. The materials of construction are preferably selected such that upon formation, there is no collapse at the center portion of the lens to thus eliminate the potential of negative curvatures and distortion. Injection molding or vacuum thermoforming may be utilized to mold the lens member. It is understood, however, that a variety of manufacturing techniques may be utilized to implement the present invention. Once the lens member is formed, a reflective surface is applied to the concave side in order to form the outer mirrored surface. A protective surface is also typically applied over the reflective surface.

Base member 42 basically has a saucer or tray-shape and can be made of any material, such as stamped metal or molded plastic. The base member also can have a flange member that corresponds to the flange member on the lens members to facilitate securing the two members together, and also to provide a structure for mounting of a sealing member.

As indicated, lens member 40 is preferably a dome lens member with a reflective convex surface with reflective mirror properties. The lens member may have a transparent protective coating on the exterior surface if desired. The reflective surface can be a sputtered metalized or silverized surface, or any other type of conventional coating in order to create a mirrored lens member.

In accordance with the present invention, the dome lens member 40 is formed with unique geometries in order to provide improved and optimum field of view advantages in combination with improved image proportions. This is accomplished in accordance with the present invention by forming the dome lens member 40 as a portion of geometric figures of certain cross-sections. In this regard, several embodiments of the present invention are illustrated in the drawings and described herein.

In the embodiment shown in FIGS. 4-9, the mirror lens is made from a portion of an elliptical toroid-shaped figure having an elliptical cross section. In the embodiment shown in FIGS. 10-15, the mirror lens member is made from a portion of a geometric figure having an elliptical toroid-shaped configuration having a circular cross-section. In the embodiment of the invention shown in FIGS. 16-21, the mirror lens is made from a portion of a circular torus-like figure having an oval-shaped cross-section. FIGS. 22-23 depict an alternative of the oval cross-sectional configuration which can be used with either of the embodiments shown in FIG. 4-9 or 16-25.

The present invention provides a family or series of mirrors, each with a lens having a defined shape from natural geometric structures. The lens is secured to a base forming a mirror assembly and the mirror assembly is adapted to be mounted on a bus or other vehicle for use as a cross-over or rear-view mirror. Appropriate brackets and mounting mechanisms are provided to mount the mirror on the vehicle.

Each of the mirror lenses is created from the shape of a portion of a particular shaped member, such as an elliptical or circular toroid or torus. The cross-sectional shape of the member will be elliptical.

A "toroid" is a geometric surface or enclosed solid which shape and structure is generated by a closed curve rotating about a straight line (e.g. axis) in its own plane. A torus is a particular form of a toroid in which the closed curve is a circle. A doughnut is an example a torus.

Figure 4:
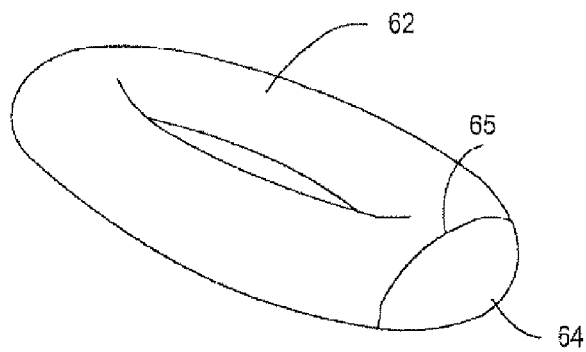
FIGS. 4-9 illustrate a first embodiment of the present invention, with FIG. 4 being a perspective view, FIG. 5 being a schematic view showing the type of geometric figures involved, FIG. 6 being a perspective view of the mirror lens itself, FIG. 7 being a side elevational view of the mirror lens, FIG. 8 being a base or footprint elevational view of the mirror lens.

In accordance with the embodiments shown in FIGS. 4-9, the mirror lens member shown schematically in FIG. 4 comprises the major-axis tip portion 64 of an oval toroid volumetric shape 62. As shown schematically in FIG. 5, the shape of the axis of the toroid-shape 62 is an oval 62A. In addition, the cross-sectional shape of the toroid-figure 62 is also an oval as shown schematically with the oval shaped axis 60A. The present invention thus is a combination of two geometric shapes that exist in nature and is not constructed in a manner to force a certain reflection or reflective surface.

Figure 5:
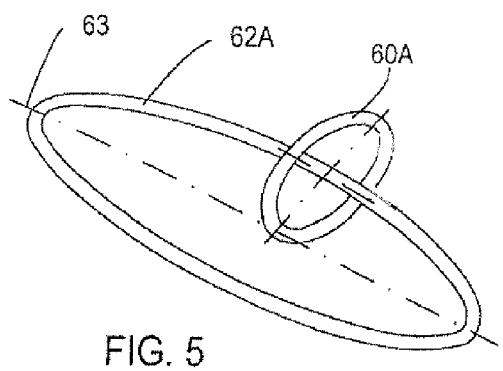
Figure 6:
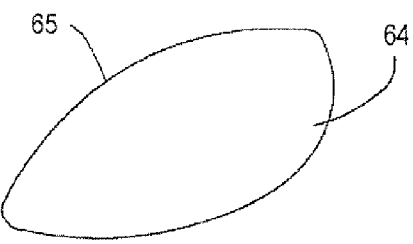

The mirror lens member 64, shown in FIG. 6, is a hollow dome-like lens member similar to lens member 40, as shown and described above with reference to FIG. 3. FIGS. 4 and 5 illustrate the manner in which the surface configuration of mirror lens member 64 is formed. Further details of the cross-sectional shape and configuration of the mirror lens member 64 are shown in FIGS. 7-9.

Figure 7:
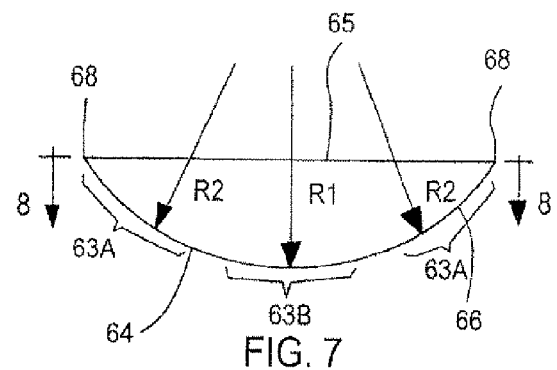

As shown in FIG. 7, the side elevational view of the lens member 64 has an elliptical surface 66. As known with elliptical surfaces, the radius of the curvature is not constant. For example, radius R1 in the center of the surface 66 merges with and continues on both sides to another radius R2 which continues to the edge 68 of the lens member. Radius R2 is greater (longer) than Radius R1.

Figure 8:
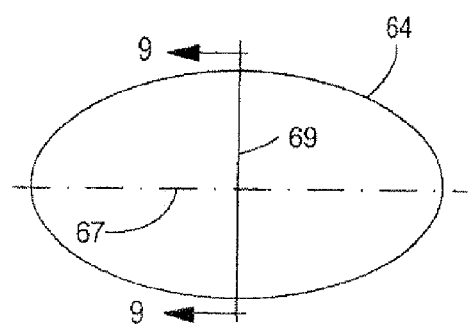

FIG. 8 shows the base or footprint of the lens member 64 and is illustrated in the direction of the arrows 8-8 in FIG. 7. As shown, a base or footprint of the lens member 64 is a true elliptical shape.

Figure 9:
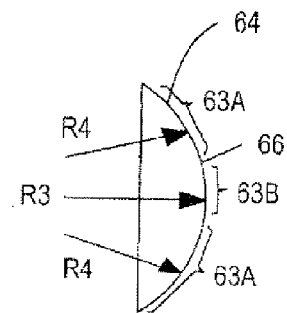

FIG. 9 is an end view of the mirror lens member 64 and is a view along line 9-9 in FIG. 8 and in the direction of the arrows. Since the cross-section of the surface 66 is also elliptical, the radius R3 in the center differs from the radius R4 at the two outer portions of the curved surface 66. Also, the length of radius R3 is less than the length of radii R4.

As shown in FIGS. 4 and 5, the mirror lens member 64 is essentially a surface cut along line 65 which is perpendicular to the major axis 63 of the elliptical geometric toroid FIG. 62, 62A. This geometric result produces a dome lens member having the various radii of curvatures as shown in FIGS. 7 and 9. The peripheral surface radius of curvature R2 and R4 are greater than the center surface radii of curvature R1 and R3. This in turn generates proportional image views coincident with the center surface portion and a second proportional image view coincident with the peripheral surface portion. The larger radius of curvature of the larger peripheral surface portions 63A results in a view proportional to the view of the center surface portion 63B. The larger radii portions will have larger reflected image sizes.

A second embodiment of the present invention is shown in FIGS. 10-15. In this embodiment, the mirror lens member 74 is produced from a geometric figure consisting of a toroid-volumetric shape 72, having a circular cross-section. In accordance with the embodiments shown in FIGS. 10-15, the mirror lens member shown schematically in FIG. 10 comprises the major-axis tip portion 74 of an oval toroid volumetric shape 72. As shown schematically in FIG. 11, the shape of the axis of the toroid-shape 72 is an ellipse 72A. In addition, the cross-sectional shape of the toroid-figure 72 is a circle as shown schematically with the circular-shaped axis 70A. The present invention thus is a combination of two geometric shapes that exist in nature and is not constructed in a manner to force a certain reflection or reflective surface.

Figure 10:
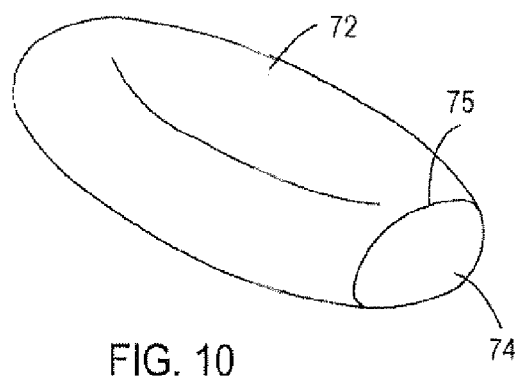
FIGS. 10-15 illustrate another embodiment of the invention, with FIG. 10 being a perspective view of the geometric figure from which the mirror lens is made, FIG. 11 being a schematic view illustrating the type of geometric figures, FIG. 12 being a perspective view of the mirror lens itself, FIG. 13 being a side elevational view of the mirror lens, FIG. 14 being a base or footprint elevational view of the mirror lens, and FIG. 15 being an end elevational view of the mirror lens.
Figure 11:
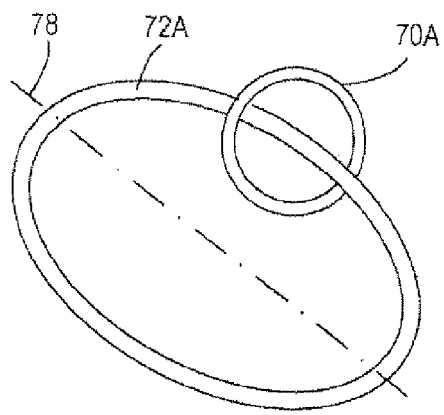
Figure 12:
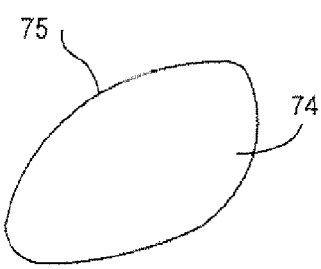

The mirror lens member 74, shown in FIG. 12, is a hollow dome-like lens in ember similar to lens member 40, as shown and described above with reference to FIG. 3. FIGS. 10 and 11 illustrate the manner in which the surface configuration of mirror lens member 74 is formed. Further details of the cross-sectional shape and configuration of the mirror lens member 74 are shown in FIGS. 13-15.

Figure 13:
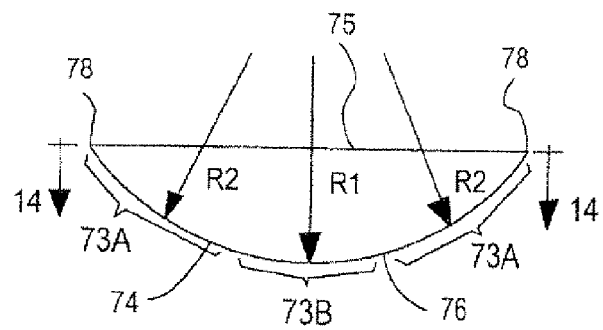

As shown in FIG. 13, the side elevational view of the lens member 74 has an elliptical surface 76. As known with elliptical surfaces, the radius of the curvature is not constant. For example, radius R1 in the center of the surface 76 merges with and continues on both sides to another radius R2 which continues to the edge of 78 of the lens member. Radius R2 is greater (larger) than Radius R1.

Figure 14:
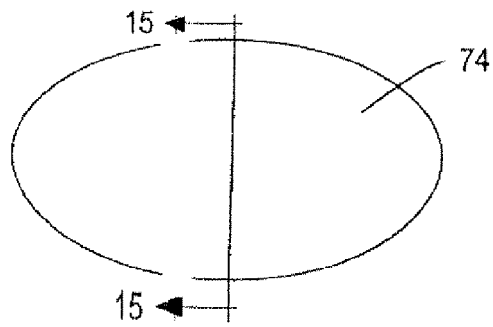

FIG. 14 shows the base or footprint of the lens member 74 and is illustrated in the direction of the arrows 14-14 in FIG. 13. As shown, a base or footprint of the lens member 74 is an elliptical shape.

Figure 15:
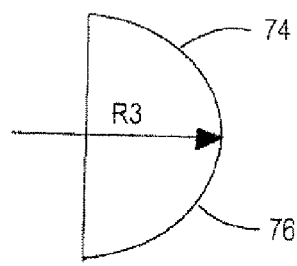

FIG. 15 is an end view of the mirror lens member 74. FIG. 15 is a view across the line 15-15 in FIG. 14 and in the direction of the arrows. Since the cross-section of the surface 76 in FIG. 15 is circular, the entire surface has a substantially uniform or constant radius R3 along the surface.

As shown in FIGS. 10 and 11, the mirror lens member 74 is essentially a surface cut along line 75 which is perpendicular to the major axis 78 of the elliptical geometric toroid figure 72, 72A. This geometric result produces a dome lens member having the various radii of curvatures as shown in FIGS. 13 and 15. The peripheral surface radius of curvature R2 is greater than the center surface radius of curvature R1, while the surface radius of curvature R3 is constant. This in turn generates proportional image views coincident with the center surface portion and a second proportional image view coincident with the peripheral surface portion. The larger radius of curvature of the larger peripheral surface portions 73A results in a view proportional to the view of the center surface portion 73B. The reflected image will have a constant height at any portion of the lens. The reflected image width will increase as the image moves on the horizontal axis from the center portions of the lens to the portions near the perimeter edges.

A third embodiment of the present invention is shown in FIGS. 16-21. In this embodiment, the mirror lens member 84 is produced from a geometric figure consisting of a circular torus volumetric shape 82 having an elliptical cross-section.

Figure 16:
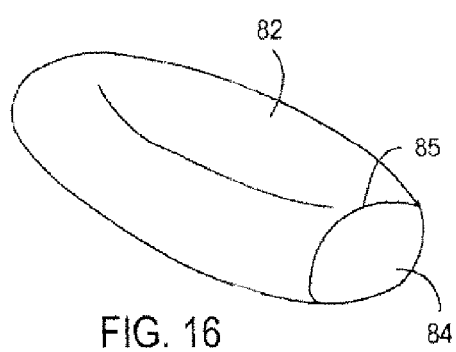
FIGS. 16-21 illustrate still another embodiment of the present invention, with FIG. 16 being a perspective view of the geometric figures for which the mirror lens is made, FIG.

In accordance with the embodiments shown in FIGS. 16-21, the mirror lens member shown schematically in FIG. 16 as the major-axis tip portion 84 of a circular torus volumetric shape 82. As shown schematically in FIG. 17, the centerline of the axis of the toroid shape 82 is a circle 82A. In addition, the cross-sectional shape of the toroid-figure 82 is all oval or elliptical shape as shown schematically with the elliptical shaped axis 80A. The present invention thus is a combination of two geometric shapes that exist in nature and is not constructed in a manner to force a certain reflection or reflective surface.

Figure 17:
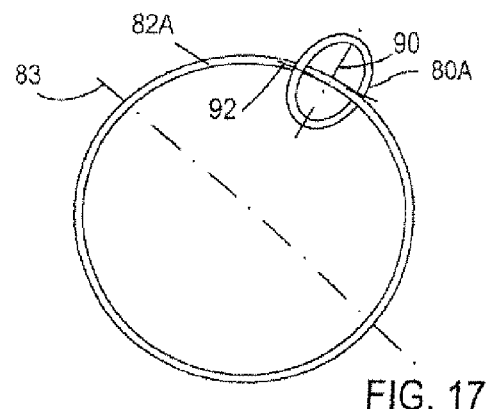

The mirror lens member 84, shown in FIG. 18, is a hollow dome-like lens member similar to lens member 40, as shown and described above with reference to FIG. 3. FIGS. 16 and 17 illustrate the manner in which the surface configuration of mirror lens member 84 is formed. Further details of the cross-sectional shape and configuration of the mirror lens member 84 are shown in FIGS. 19-21.

As shown in FIG. 19, the side elevational view of the lens member 84 has a circular surface 66. The radius of the curvature R1 is uniform or constant.

FIG. 20 shows the base or footprint of the lens member 84 and is illustrated in the direction of the arrows 20-20 in FIG. 19. As shown, a base or footprint of the lens member 84 is an elliptical shape.

FIG. 21 is an end view of the mirror lens member 84. FIG. 21 is a view in the direction across the line 21-21 in FIG. 20 and in the direction of the arrows. Since the cross-sectional of the surface 86 in FIG. 21 is elliptical, the radius R3 in the center differs from the radius R4 at the two outer portions of the curved surface 86. The length of radius R2 is less than the length of the radii R4.

As shown in FIGS. 16 and 17, the mirror lens member 84 is essentially a surface cut along line 85 which is perpendicular to a diameter 83 of the circular geometric FIG. 82, 82A. This embodiment with an elliptical cross-section produces a dome lens member having the curvatures as shown in FIGS. 19 and 21. The peripheral surface radius of curvature R4 is greater than the center surface radius of curvature R3, while the radius of curvature of surface R1 is constant. This in turn generates proportional image views coincident with the center surface portion and a second proportional image view coincident with the peripheral surface portion. The larger radius of curvature of the peripheral surface portions 83A results in a view proportional to the view of the center surface portion 83B. The reflected image will have a constant width, but the height of the image will change on the vertical axis as the image moves from the center portions of the lens to portions near the perimeter edges.

Also, as indicated in the embodiment of the invention shown in FIGS. 16-21, the major axis 90 of the elliptical shape 80A (FIG. 17) is perpendicular to the axis 82A of the toroid shape 82, and the minor axis 92 is parallel or in alignment with the axis 82A. In the same manner as indicated in the embodiment of the invention shown in FIGS. 4-9, the major axis 90 of the elliptical shape 80A is perpendicular to the axis 82A of the toroid shape 82A, and the minor axis 92 is parallel to or in alignment with the axis 82A.

As shown in further embodiments of the invention, the elliptical shapes 60A and 80A can be rotated 90° to change the relative position of the major and minor axes and provide mirror lens curvatures of different shapes and reflective abilities. This is shown schematically in FIGS. 22-23 where the repositioned elliptical shapes 64' and 84' are shown. It is also possible for the major axis 90' and minor axis 92' to be positioned at an angle A as represented schematically by dashed line 100 in FIG. 22. This provides images which differ in size in different portions of the mirror lens.

Also, it is also possible ill accordance with the present invention to change the angle at which the lens is "cut-off" from the imaginary toroid figure, which in turn will change the uniformity of the sizes of the reflected images on various portions of the lenses. For example, as shown with the three embodiments of the invention shown in FIGS. 4-9, 10-15 and 16-21, the planes of the "cut" lines 65, 75 and 85 are substantially perpendicular (both vertically and horizontally) to the major axes or diameter 63, 78 and 83, respectfully. However, it is also possible with alternative embodiments to angle or rotate the "cut" lines either in the vertical or horizontal directions, or both. These embodiments will create lens all with oval footprints but with reflected images which will differ from one side portions of the lenses relative to the other side portions of the lenses, and/or relative to the center portions of the lenses. Once it is determined the relative sizes of the reflected images which are desired from the various portions of the lenses, then the specific angle and orientation of the particular "cut" line on the particular toroid figure call be determined and implemented.

While particular embodiments of the invention have been shown and described, numerous variations and alternative embodiments will occur to those skilled in the art. Accordingly, it is intended that the invention be limited only in terms of the appended claims.

What is claimed is:

1. A mirror assembly comprising:
   a base member;
   a dome lens member attached to said base member, said dome lens member having a continuously varying radius of curvature, said dome lens member comprising:
   a center surface portion having a center surface radius of curvature; and
   a peripheral surface portion having a peripheral surface radius of curvature, said peripheral surface radius of curvature greater than said center surface radius of curvature;
   wherein said center surface portion forms a first proportion image view and said peripheral surface portion forms a second proportion image view, said first proportion image view generating smaller image proportions than said second proportion image view, wherein said dome lens member comprises a major axis tip portion of an ellipsoid.

2. A mirror assembly as described in claim 1 wherein a dome depth is less than one third of a dome width.

3. A vehicle mirror as described in claim 1 wherein said major axis tip portion comprises a dome depth less than one tenth of a major axis length of said ellipsoid.

4. A vehicle mirror as described in claim 1 wherein said ellipsoid includes a minor axis length less than half of a major axis length.

5. A vehicle having at least one mirror assembly thereon, said mirror assembly comprising:
   a base member;
   a dome lens member attached to said base member, said dome lens member having a continuously varying radius of curvature, said dome lens member comprising:
   a center surface portion having a center surface radius of curvature; and
   a peripheral surface portion having a peripheral surface radius of curvature, said peripheral surface radius of curvature greater than said center surface radius of curvature;
   wherein said center surface portion forms a first proportion image view and said peripheral surface portion forms a second proportion image view, said first proportion image view generating smaller image proportions than said second proportion image view, wherein said dome lens member comprises a major axis tip portion of an ellipsoid.

6. The vehicle as set forth in claim 5 further comprising a mounting bracket member for attaching said mirror assembly to said vehicle.

7. The vehicle as set forth in claim 5 wherein said vehicle is a bus.

8. The vehicle as set forth in claim 5 wherein two mirror assemblies are positioned on said vehicle.

9. The vehicle as set forth in claim 8 wherein said vehicle is a bus and said mirror assemblies are positioned on the fender of said bus.

10. The vehicle as set forth in claim 9 further comprising mounting bracket members attaching said mirror assemblies to said bus.

* * * * *